United States Patent [19]

Dieul

[11] Patent Number: 4,966,425
[45] Date of Patent: Oct. 30, 1990

[54] REFLECTING SCREEN, ITS MANUFACTURING METHOD AND ITS APPLICATION TO HEAT-INSULATION DEVICE

[75] Inventor: Jean Henri L. Dieul, Voisin le Bretonneaux, France

[73] Assignee: Bronzavia Air Equipment, Courbevoie, France

[21] Appl. No.: 410,006

[22] Filed: Sep. 20, 1989

Related U.S. Application Data

[63] Continuation of Ser. No. 1,190, Jan. 7, 1987, abandoned.

[30] Foreign Application Priority Data

Jan. 10, 1986 [FR] France ................. 86 00320

[51] Int. Cl.$^5$ ............................. G02B 5/28
[52] U.S. Cl. ................... 350/1.7; 350/1.6; 350/166
[58] Field of Search .......... 350/1.7, 1.6, 164, 166

[56] References Cited

U.S. PATENT DOCUMENTS

| | | | |
|---|---|---|---|
| 3,531,313 | 9/1970 | Dates | 350/1.7 X |
| 3,671,286 | 6/1972 | Fischell | 350/1.7 |
| 4,337,990 | 7/1982 | Fan et al. | 350/1.7 |
| 4,556,277 | 12/1985 | Fan et al. | 350/1.7 |

FOREIGN PATENT DOCUMENTS

| | | | |
|---|---|---|---|
| 550365 | 12/1959 | Belgium | 350/1.7 |
| 2033461 | 12/1970 | France | |
| 2378576 | 8/1978 | France | |
| 1012621 | 12/1965 | United Kingdom | |
| 1107877 | 3/1968 | United Kingdom | |

OTHER PUBLICATIONS

Hollingsworth Smith, P., et al, "Silicon Dioxide as a High Temperature Stabilizer for Silver Films," *Thin Solid Films* 45 (1977) 159-168.

*Primary Examiner*—Bruce Y. Arnold
*Assistant Examiner*—Martin Lerner
*Attorney, Agent, or Firm*—Oblon, Spivak, McClelland, Maier & Neustadt

[57] ABSTRACT

A screen for reflecting radiation, especially infra-red radiation for use at a temperature of at least 900° C. The screen includes a first layer of a bright and polished material, which does not deteriorate when it is brought to the temperature, for reflecting at least a part of the infra-red radiation, and also includes a second layer of a material forming a support. Interposed between the first two layers is at least one third layer of material to block the radiation which issues from a preceding layer, the interposed layer being joined to its two neighboring layers.

15 Claims, 2 Drawing Sheets

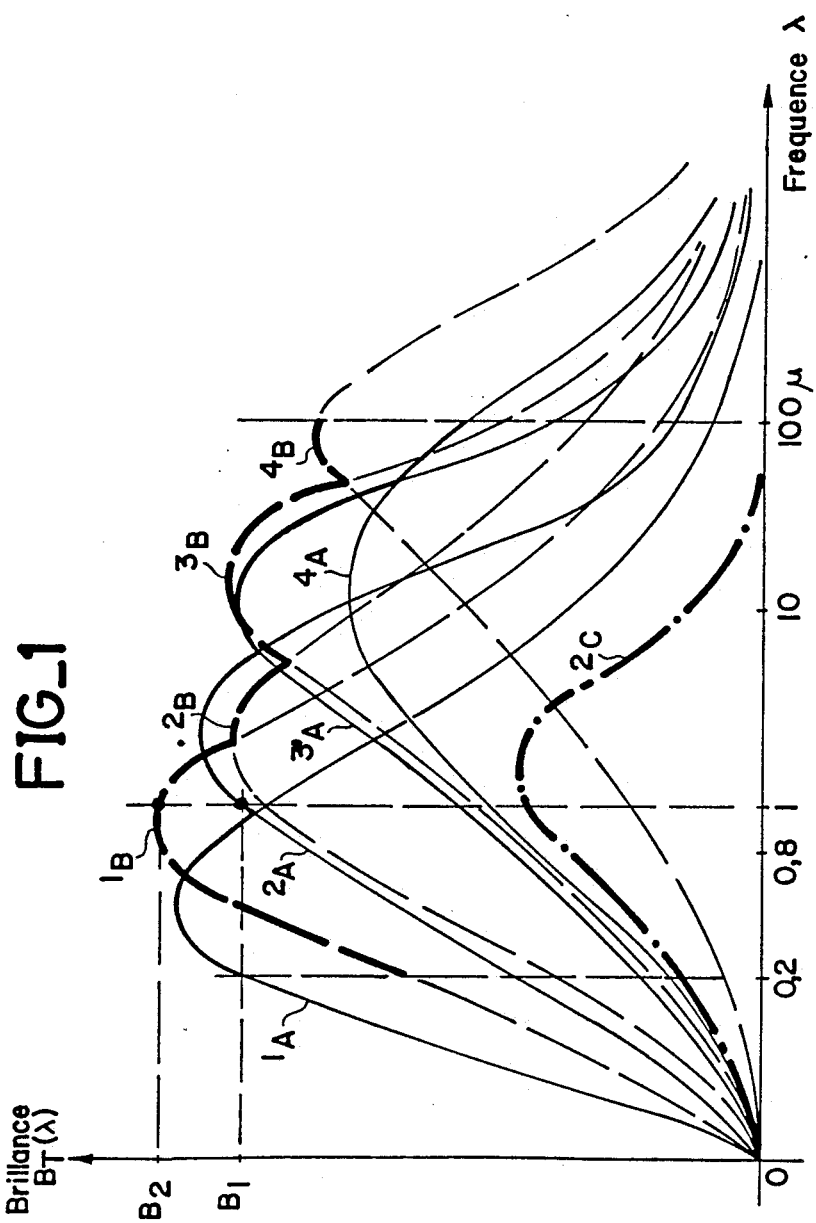

FIG_2
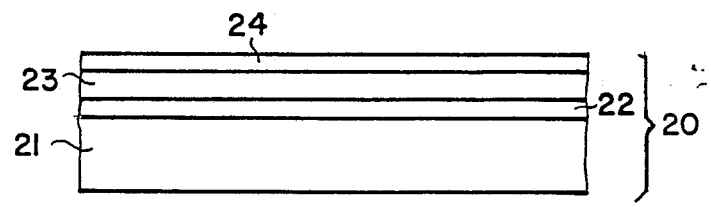
FIG_3
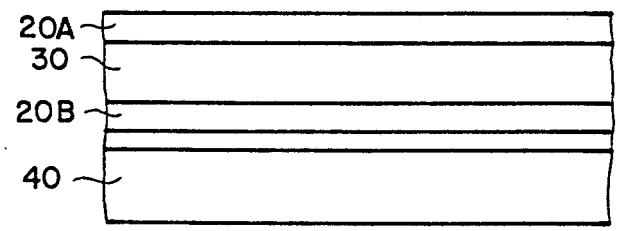
FIG_4
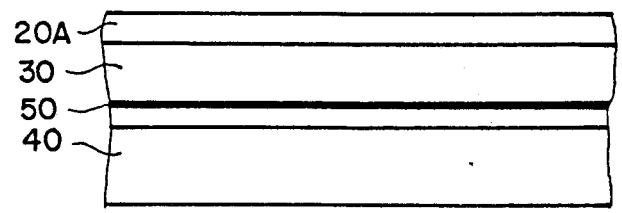

REFLECTING SCREEN, ITS MANUFACTURING METHOD AND ITS APPLICATION TO HEAT-INSULATION DEVICE

This application is a continuation of application Ser. No. 001,190, filed on Jan. 7, 1987, now abandoned.

BACKGROUND OF THE INVENTION

1. Field of the Invention

The invention pertains to a radiation reflecting screen which remains efficient and does not deteriorate when used at a determined temperature for a fairly long period of time, especially a reflecting screen which can be used at a temperature of at least 900° C., to the method of its manufacture and to its application to the constitution of a heat-insulation device.

Reflecting screens are used in heat-insulation devices or, again, in heat-concentrating devices.

In heat-insulation devices, the purpose of the reflecting screens is to block heat transmission by infra-red radiation. They are generally used in combination with insulating materials which block the transmission of heat by convection.

2. STATE OF THE PRIOR ART

Thus, light and compact insulating devices are known in the prior art: these devices comprise, for example, thin supports made of mica, lined with a material which has high reflecting power and reduced emissive power, associated with mineral wool and used especially in aeronautics because of their lightness and low bulk.

In heat-concentrating devices, the reflecting screens act as mirrors. Devices of this type are found surrounding furnaces, for example.

The efficiency of a screen is all the greater as its reflecting capacity is high, i.e. when its opaqueness to radiation is substantial. For this, the screens used are made of polished and bright material such as colloidal gold or else molten gold sprayed on the support.

Again, in insulating devices, the efficiency of a screen is all the greater as its emissive power is low. For, depending on the their temperature, certain materials emit an inherent radiation which is often a function of the temperature and which impairs efficiency because it creates heat beyond the screen.

Furthermore, the efficiency of a screen depends on the frequency of the incoming radiation. For a screen may be opaque at certain frequencies and more or less transparent at other frequencies. In this case, the screen may re-emit a portion of the radiation absorbed, in addition to its own temperature-related radiation.

Furthermore, the higher the temperature the more the infra-red radiation received by a screen extends over a very large range of frequencies, and a single screen is not enough to stop the radiation. This is why, in heat-insulation devices used at high temperatures, several screens have to be interposed in between several layers of wool or a similar material in order to stop the radiation to the maximum extent.

Besides, certain materials cannot be used beyond a certain temperature when they are in contact with the ambient air, for they get oxidized and then irreversibly lose all or a part of their reflecting capacity. Consequently, they absorb more radiation and, correlatively, tend to re-emit more radiation.

The same holds true for screens which are interposed in the wool of insulation devices for there is an air cushion in the interior.

In conclusion, the reflecting screens of the prior art behave differently for conditions of use at different temperatures and/or behave differently in relation to incoming frequencies, and cannot be used at high temperatures.

SUMMARY OF THE INVENTION

The screen according to the invention does not have these disadvantages.

The radiation reflecting screen according to the invention, designed for use at a determined temperature of at least 900° C., comprises, on the one hand, a first layer of a bright and polished material which reflects at least a portion of the infra-red radiation frequencies and which does not deteriorate when brought to the said temperature, and on the other hand, a second layer of supporting material. The said radiation reflection screen also comprises, interposed between the first two layers, at least one third layer of a material to stop the radiation which issues from the preceding layer, an interposed layer being joined to its two neighbouring layers.

The radiation that issues from the first layer may be the inherent radiation of this layer depending on the temperature and/or a part of the radiation which is not reflected by this layer.

Thus, in interposing several successive layers, a screen is achieved with a reflecting power for the totality of the infra-red radiation.

A prime advantage of the invention lies in the fact that the first and second layers of materials insulate and shield the interposed layers of the external environment. Consequently, it is possible to make these interposed layers with materials which would be damaged or oxidized at the working temperature if they were in direct contact with the external environment. The answers known in the prior art cannot, under any circumstances, make it possible to contemplate the use of these materials for temperatures higher than the oxidation or damaging temperature, in contact with the external environment, unless a special shielding treatment is provided.

According to another characteristic of the invention, the screen is made by successively forming the different layers of the reflecting materials by depositing them on one another. The depositing can be done in a similar way for each layer or, depending on the materials, in a different way from one layer to another.

The process involved may be a vapour-phase chemical depositing process, a cathode-sputtering process or again, an electrolytic depositing process.

According to another characteristic, the screen thus built is used to make heat-insulation devices comprising a limited number of layers that block convection, and a limited number of screens.

For, if the last layer of the first screen facing the wool re-emits practically no infra-red radiation at the working temperature, a single cushion of wool to stop the conduction heat will be enough.

BRIEF DESCRIPTION OF THE DRAWINGS

Other characteristics and advantages of the invention will emerge from the following description of some modes of embodiment made with reference to the appended figures of which:

FIG. 1 depicts the brightness curves as a function of the radiation curves for two given temperatures of a screen according to the invention;

FIG. 2 is a schematic cross-section of a screen according to the invention;

FIG. 3 is a schematic cross-section of a first heat-insulating device made with two screens according to the invention;

FIG. 4 is a schematic cross-section of a second heat-insulating device made with a screen according to the invention.

DESCRIPTION OF THE PREFERRED EMBODIMENTs

FIG. 1 depicts the brightness curves $B_T(\lambda)$, as a function of the $\lambda$ frequencies of radiation for two different temperatures of a screen according to the invention.

The brightness of a material is a function of its reflecting power. The greater the brightness, the greater the reflecting power.

In the mode of embodiment corresponding to the curves of this FIG. 1, the screen has four layers of reflective materials formed on top of one another and set on a support material through which adequate rigidity can be given to the entire unit.

The two end layers are directly in contact with the outer environment. They are made of materials which do not get oxidized at the maximum working temperature laid down for the screen. One of these end layers therefore comprises the support.

The intermediate layers are sheltered from contact with the outside environment and, therefore, cannot be oxidized. The only condition governing the choice of the materials that comprise them is that these materials should not be damaged by heat during use.

At a given working temperature, each layer of material has its own brightness curve, and the brightness of the screen, resulting from the association of these curves, is equal, for a given frequency $\lambda$ to that of the material which has the highest value at the frequency and at the temperature under consideration.

In the example of FIG. 1 for a screen comprising four layers of reflecting materials, the curves 1A, 2A, 3A, 4A are the brightness curves of each of the materials used for a first working temperature, and the curves 1B, 2B, 3B, 4B are the brightness curves of these materials for a second working temperature.

It is observed, in these curves, that the brightness of the materials varies with the temperature and that the overall brightness of the screen and, hence, its reflecting power vary too.

In the example depicted, it is observed that the brightness of the screen for a radiation frequency of 1 micron has a value B1 for a first working temperature and a second value B2 for a second working temperature.

The value B1 at the first temperature is taken at the curve 2A of the material which has the curve 2B at the second temperature while, at the second temperature, the value B2 is on the curve 1B of the material which has the curve 1A at the first temperature.

It is thus observed that, for one and the same given frequency of radiation but for two different working temperatures, the brightness of the screen may be different and, in all cases, this brightness is that of the material with the highest value at the frequency and temperature under consideration. This brightness can therefore be determined by the same material or by two different materials.

Of course, the brightness is determined when fragile materials are not subjected to the influence of the external environment.

Thus, for example, the material which determines the curves 2A and 2B for two different working temperatures is a material which is damaged in contact with the external environment starting from a temperature lower than the planned working temperatures.

When the screen is being made, this material must therefore constitute one of the intermediate layers so that it can be protected by the neighbouring layers and it must be capable of possessing both curves 2A and 2B. If this material is placed, as it is, in contact with the outside environment, it would have, for example, for the temperature causing the curve 2A, a curve 2C with far lower brightness values and it would be unusable in the constitution of an efficient screen.

Infra-red radiation is radiation the wavelength of which ranges from 0.8 to 100 microns. However, it is observed on the curve that, depending on the materials used, the screen may reflect a wider range than that of infra-red radiation.

FIG. 2 represents a cross-section of a screen 20 according to the invention.

The screen 20 depicted comprises, for example, a layer 21 of a support material and three layers 22, 23, 24 of materials with a reflective power which is different at different frequencies, for a given temperature.

The supporting material 21 is chosen according to the maximum planned working temperature.

Thus, for example, if it is planned to use the screen at a temperature of less than 1000° C., the support material may be a metallic compound of the refractory type, and if it is planned to use the screen at temperatures of more than 1000° C., the support will be made with mica or organic compounds or, again, using a mixture of carbon and silicon carbide.

The layer 24 of the reflecting material located outside may be gold-based because this material does not get oxidized at high temperatures.

The intermediate layers 22, 23 may comprise materials which reflect the frequencies that gold lets through or frequencies that gold re-emits.

Thus, it is possible to use copper, nickel, chromium, silver, platinum, palladium, tungsten, or molybdenum to make either of the intermediate layers.

These intermediate layers may also be made of nitride-based materials, such as titanium nitrides or hafnium nitrides, or they may be oxide based or ceramic.

The thickness of the screen 20 thus made may be less than 100 microns, the support having a thickness of approximately 5 to 10 microns and each of the successive layers having a thickness of less than 10 microns.

The various layers can be made successively on the support by electrolysis, vapour-phase depositing or cathode-sputtering. It simply suffices that the method used to deposit a layer does not destroy either of the layers deposited earlier or that it does not cause a reaction of deterioration of the material deposited on the preceding layers.

FIG. 3 depicts a heat-insulating device comprising two screens 20A and 20B made according to the invention, each having at least two layers of reflecting materials.

Between these two screens, there is, for example, a cushion 30 made of an insulating material such as mineral wool to limit conduction.

This device provides a part 40 with heat-insulation against the exterior in the event that the part 40 is at a high temperature and when it is necessary to prevent outward radiation, or else in the event that the exterior is at a high temperature while the part 40 has to be kept at a lower temperature.

The use of two screens 20A, 20B, according to the invention, on either side of the material 30 which insulates conduction phenomena may be necessary if, for the working temperature, the first screen interposed between the heat source and the material 30 re-emits infra-red radiation within a fairly wide range of frequencies.

The device of the FIG. 4 is used when the first screen 20A interposed between the heat source and the material 30 which insulates conduction phenomena does not re-emit or practically does not re-emit any radiation. In this case, in order to hold the material 30, which insulates the conduction phenomena, in place, a device is made comprising a screen 20A according to the invention, a cushion of material 30, and a partition 50 used to maintain the material 30 and, if necessary, to absorb the residual infra-red radiation transmitted by the first screen 20A.

It is understood that, in this case, the device is mounted for use in such a way that the screen 20A according to the invention is placed on the hottest side and the partition 50 which maintains the insulating material is placed on the least hot side, namely the side from which it is sought to prevent heat transmission.

It is understood that means, not depicted in the drawing, can be provided to hold together the elements 20A, 30, 20B or 50, which constitute the insulating device. Means can also be provided to make the device tightly sealed and to prevent the material 30 (should be it sensitive to humidity or the outside environment) from being damaged or oxidized.

A screen according to the invention is particularly advantageous because it is opaque to infra-red radiation for a wide range of frequencies. With screens of the prior art, it would have been necessary to use a multitude of screens each made up by the superimposition of a layer of reflecting material on a layer of supporting material.

The invention therefore saves supporting material because a single layer of material can support an indefinite number of layers of reflecting materials, and it is possible to make insulating devices of reduced thickness.

Finally, it is possible to use reflecting materials which are unusable in the prior art because of their sensitivity to outside environment at high temperatures.

What is claimed is:

1. Screen to reflect radiation, especially infrared radiation, designed to be used at a determined temperature of at least 900° C. comprising:
   a support layer of an opaque refractory material;
   at least, a first layer of a reflecting material deposited on the support layer which reflects infrared radiation over a first specific frequency range;
   a second layer covering said first layer, said second layer being made of a bright and polished material different from the material used in the first layer, which does not deteriorate when it is brought to the said temperature and reflects at least a part of the infrared radiation over a second specific frequency range different from the first specific frequency range but in part superposed to said first specific frequency range;
   the first layer blocking the radiation not reflected by the second layer;

2. Screen according to claim 1, wherein the first layer is constituted by at least two layers.

3. Screen according to claim 1, wherein the support layer is made of a material chosen amoung mica-based material, organic compound, or refractory type of metallic compound.

4. Screen according to claim 3, wherein the organic compound contains a mixture of carbon and silicon carbide.

5. Screen according to claim 1, wherein the first layer is made of a material chosen among copper, chromium, platinum, silver, palladium, tungsten, molybdenum, nitride-base material, oxide based material or ceramic.

6. Screen according to claim 5, wherein the nitride-based material is chosen among nitride of titanium, nitride of hafnium, nitrides of titanium and hafnium.

7. Screen according to claim 1, wherein the second layer is made of a gold-based material.

8. Screen according to claim 1, wherein the support layer, the first and second layers are thin layers whose thickness is 10 microns or less.

9. A screen according to claim 1, wherein the first and second layers are one of deposited layers, electrolytic deposited layers, vapor-phase deposited layers and cathode-sputtered layers.

10. A screen according to claim 1 further comprising one layer of material to stop the conduction of heat beyond the screen, said layer covering the support layer of the screen.

11. A screen according to claim 10, wherein the layer of material to stop the conduction is made with mineral wool.

12. A screen according to claim 1, further comprising one layer of material to stop the conduction of heat beyond the screen, said layer covering the support layer of the screen and a partition used for holding and tight sealing.

13. A screen according to claim 12, wherein the layer of material to stop the conduction is made with mineral wool.

14. A screen according to claim 1, further comprising, one layer of material to stop the conduction of heat beyond the screen, said layer covering the support layer of the screen and a second screen identical to said screen positioned so that the second layer of the second screen contacts the said layer of material to stop the conduction.

15. A screen according to claim 14, wherein the layer of material to stop the conduction is made with mineral wool.

* * * * *